(12) United States Patent
Chang

(10) Patent No.: US 7,327,297 B2
(45) Date of Patent: Feb. 5, 2008

(54) SOURCE DRIVER OF LIQUID CRYSTAL DISPLAY AND THE DRIVING METHOD

(75) Inventor: Yaw-Guang Chang, Hsinhua (TW)

(73) Assignee: Himax Technologies Limited (TW)

( * ) Notice: Subject to any disclaimer, the term of this patent is extended or adjusted under 35 U.S.C. 154(b) by 0 days.

(21) Appl. No.: 11/428,196

(22) Filed: Jun. 30, 2006

(65) Prior Publication Data

US 2008/0001800 A1  Jan. 3, 2008

(51) Int. Cl.
*H03M 1/66* (2006.01)

(52) U.S. Cl. .......................... 341/144; 345/99

(58) Field of Classification Search .......... 341/144; 345/99, 204; 348/691, 689

See application file for complete search history.

(56) References Cited

U.S. PATENT DOCUMENTS

| 7,030,936 B2* | 4/2006 | Sasada | 348/691 |
| 7,098,886 B2* | 8/2006 | La | 345/99 |
| 2007/0040773 A1* | 2/2007 | Lee et al. | 345/77 |

* cited by examiner

*Primary Examiner*—Rexford Barnie
*Assistant Examiner*—Joseph Lauture
(74) *Attorney, Agent, or Firm*—Hayes Soloway P.C.

(57) ABSTRACT

A source driver has many channels, and each channel has a DAC, a clamp circuit and a fine tune circuit. The DAC selects a first reference voltage and a second reference voltage from a plurality of gamma voltages according to (N−1) most significant bits of an N-bit signal. The clamp circuit receives the two reference voltages and clamps an output voltage between the two reference voltages. The fine tune circuit adjusts the clamped output voltage to a target level according to the least significant bit of the N-bit signal.

15 Claims, 8 Drawing Sheets

SOURCE DRIVER OF LIQUID CRYSTAL DISPLAY AND THE DRIVING METHOD

BACKGROUND

1. Field of Invention

The present invention relates to liquid crystal display. More particularly, the present invention relates to a source driver and the driving method for low power applications.

2. Description of Related Art

A liquid crystal display (LCD) has many advantages over other types of displays, and is widely used in various applications such as televisions, mobile phones, video camcorders, personal computers and so on. Image data of the LCD are provided through one or more source drivers.

FIG. 1 is a block diagram depicting a conventional source driver 100 used in an LCD. The source driver 100 has many channels (only one channel is shown in FIG. 1), and each channel has a DAC 102 and an output buffer 104. The DAC 102 selects one gamma voltage from a set of gamma voltages (e.g. V0~V63) according to all the bits of an N-bit signal (e.g. the bits B0, B1, B2, B3, B4, B5 of a 6-bit signal). The output buffer 104 receives the selected gamma voltage from the DAC 102 and outputs it to an LCD panel 106.

In order to reduce power consumption, the output buffer 104 requires many controls or a complicated class AB amplifier, which may complicate the circuit design or occupy a large chip area. Therefore, it is much desired to provide a low power source driver and the driving method, which only requires a simple circuit design and fewer controls.

FIG. 2 is a block diagram depicting a conventional output buffer 200 used in the source driver 100 of FIG. 1. The output buffer 200 has a PMOS transistor 202, a NMOS transistor 204, a first error amplifier 212 and a second error amplifier 214. The PMOS transistor 202 and the NMOS transistor 204 are electrically connected in series between a high-level voltage (VDDA) and a low-level voltage (VSSA). The gate of the PMOS transistor 202 is electrically connected to the output of the first error amplifier 212, and the gate of the NMOS transistor 204 is electrically connected to the output of the second error amplifier 214. An input voltage (Vin), i.e., the selected gamma voltage from the DAC 102, is input to inverting inputs of the error amplifiers 212 and 214. The non-inverting inputs of the error amplifiers 212 and 214 are electrically connected to each other and coupled to a connection node between the PMOS transistor 202 and the NMOS transistor 204, i.e., the drains of the PMOS transistor 202 and the NMOS transistor 204, to provide an output voltage (Vout) to an LCD panel 222.

With this architecture, the output buffer 200 can occupy a small chip area compared to the widely-used class AB amplifier. However, the error amplifiers may generate an offset voltage of 30 mV or require a complicated circuit design to compensate the offset voltage.

SUMMARY

It is therefore an aspect of the present invention to provide a source driver of a liquid crystal display with a simply designed, low power consumption circuit.

According to one preferred embodiment of the present invention, the source driver has many channels, and each channel comprises a DAC, a clamp circuit and a fine tune circuit. The DAC is arranged to select a first reference voltage and a second reference voltage from a plurality of gamma voltages according to (N−1) most significant bits of an N-bit signal. The clamp circuit is arranged to receive the two reference voltages and clamp an output voltage between the two reference voltages. The fine tune circuit is arranged to adjust the clamped output voltage to a target level according to the least significant bit of the N-bit signal.

It is another aspect of the present invention to provide a source driving method for a liquid crystal display, which requires few control steps and can rapidly obtain the target level.

According to another preferred embodiment of the present invention, a first reference voltage and a second reference voltage are selected from a plurality of gamma voltages according to (N−1) most significant bits of an N-bit signal. An output voltage is clamped between the two reference voltages. The clamped output voltage is adjusted to a target level according to the least significant bit of the N-bit signal.

It is another aspect of the present invention to provide a source driver of a liquid crystal display, which can lower the complexity of circuit design and also decrease the occupied area thereof.

According to another preferred embodiment of the present invention, the source driver has a plurality of channels and each channel comprises a DAC and an output buffer. The DAC is arranged to select a reference voltage from a plurality of gamma voltages according to all the bits of an N-bit signal. The output buffer comprises a PMOS transistor, a NMOS transistor, a first error amplifier, a second error amplifier, a first offset voltage generation circuit, a second offset voltage generation circuit and a fine tune circuit. The PMOS transistor and the NMOS transistor are electrically connected in series between a high-level voltage and a low-level voltage. An inverting input of the first error amplifier is arranged to receive the reference voltage, a non-inverting input of the first error amplifier is electrically connected to a connection node between the PMOS transistor and the NMOS transistor to output an output voltage, and an output of the first error amplifier is electrically connected to the gate of the PMOS transistor. An inverting input of the second error amplifier is arranged to receive the reference voltage, a non-inverting input of the second error amplifier is electrically connected to the connection node, and an output of the second error amplifier is electrically connected to the gate of the NMOS transistor.

The first offset voltage generation circuit and the second offset voltage generation circuit are electrically connected to the outputs of the first error amplifier and the second error amplifier. The offset voltage generation circuits are arranged to pull up or pull down the output voltage to be between the input voltage and the input voltage plus or minus an offset voltage. The fine tune circuit is electrically connected to the non-inverting inputs of the error amplifiers, and arranged to adjust the output voltage to be the input voltage.

It is another aspect of the present invention to provide a source driving method of a liquid crystal display, which can rapidly obtain the target level and reduce the power consumption.

According to another preferred embodiment of the present invention, a reference voltage is selected from a plurality of gamma voltages according to all the bits of an N-bit signal. An output voltage is pulled up between the input voltage and the input voltage plus an offset voltage when the input voltage is above one half of the high-level voltage; or the output voltage is pulled down between the input voltage and the input voltage minus the offset voltage when the input voltage is below one half of the high-level voltage. Then, the pulled output voltage is adjusted to be the input voltage.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
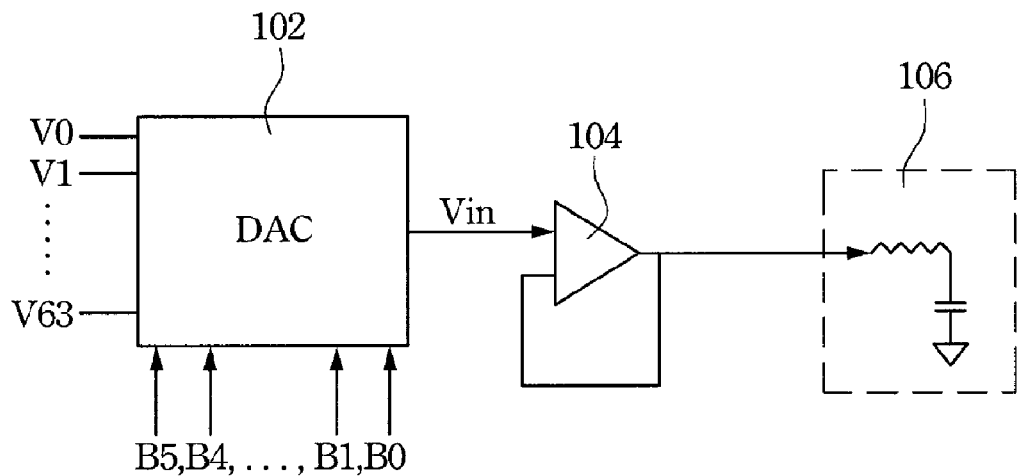
FIG. 1 is a block diagram depicting a conventional source driver used in an LCD.
Figure 2:
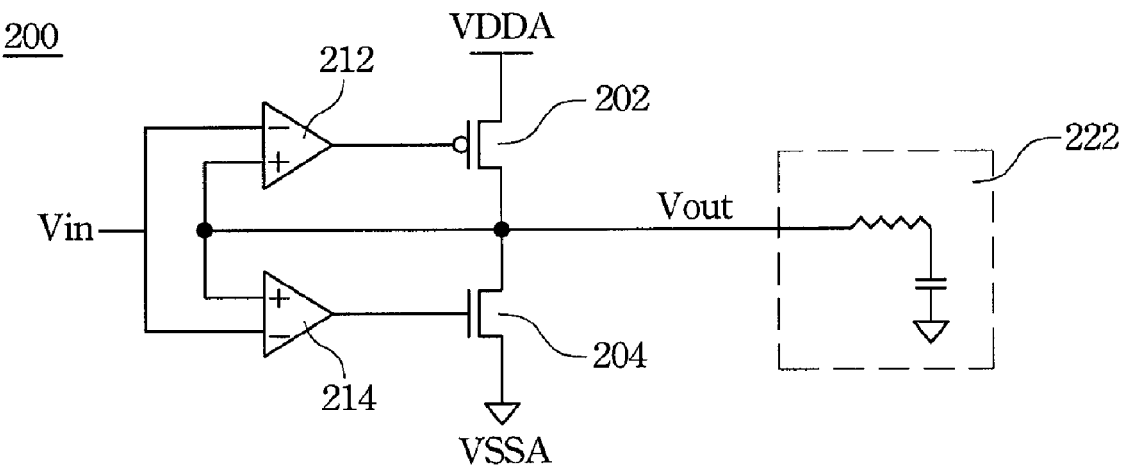
FIG. 2 is a block diagram depicting a conventional output buffer used in the source driver of FIG. 1.

Reference will now be made in detail to the present preferred embodiments of the invention, examples of which are illustrated in the accompanying drawings. Wherever possible, the same reference numbers are used in the drawings and the description to refer to the same or like parts.

Figure 3:
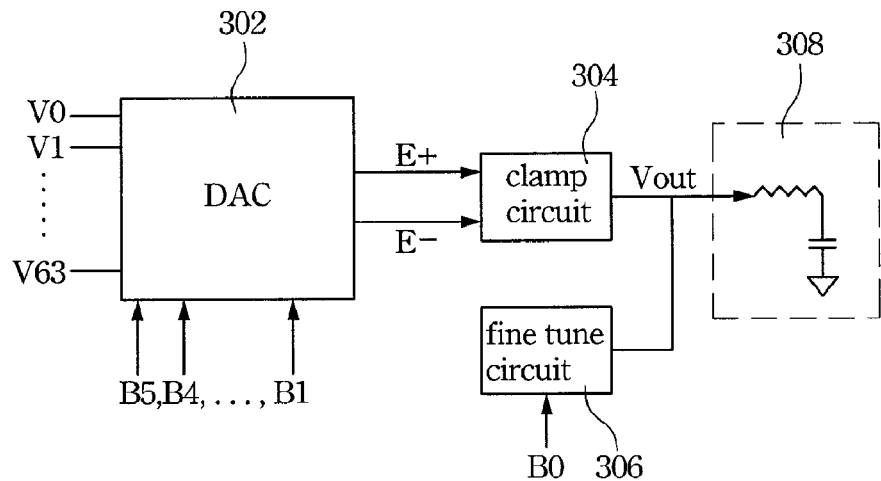
FIG. 3 is a block diagram depicting a source driver used in an LCD according to one preferred embodiment of the present invention.

FIG. 3 is a block diagram depicting a source driver 300 used in an LCD according to one preferred embodiment of the present invention. The source driver 300 has many channels (only one channel is shown in FIG. 3), and each channel has a DAC 302, a clamp circuit 304 and a fine tune circuit 306. The DAC 302 selects a first reference voltage (E−) and a second reference voltage (E+) from a plurality of gamma voltages (V0~V63) according to, for example, the five most significant bits (B1, B2, B3, B4, B5) of a 6-bit signal. The clamp circuit 304 receives the two reference voltages (E+, E−) and clamps an output voltage (Vout) between the two reference voltages (E+, E−). The fine tune circuit 306 adjusts the clamped output voltage (Vout) to a target level, i.e., the first reference voltage or the second reference voltage, according to, for example, the least significant bit (B0) of the 6-bit signal.

Figure 4:
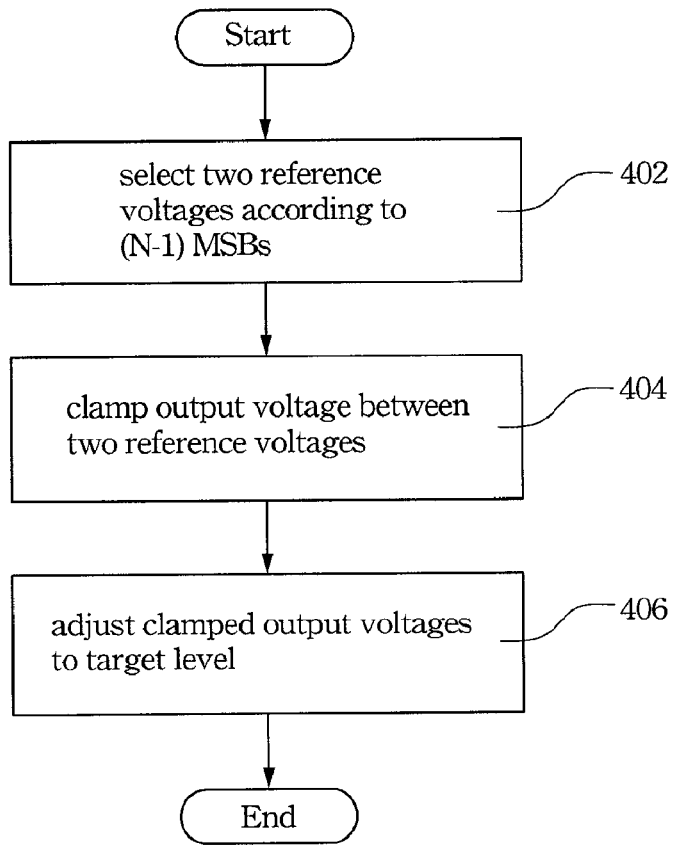
FIG. 4 is a flow chart depicting the driving method of the source driver as shown in FIG. 3.

FIG. 4 is a flow chart depicting the driving method of the source driver as shown in FIG. 3. Firstly, a first reference voltage (E−) and a second reference voltage (E+) are selected from a plurality of gamma voltages (e.g. V0~V63) according to (N−1) most significant bits (e.g. B1, B2, B3, B4, B5) of an N-bit signal (step 402). An output voltage (Vout) is clamped between the two reference voltages (E−, E+) (step 404). Then, the clamped output voltage (Vout) is adjusted to a target level, i.e., the first reference voltage or the second reference voltage, according to the least significant bit (e.g. B0) of the N-bit signal (step 406).

Figure 5A:
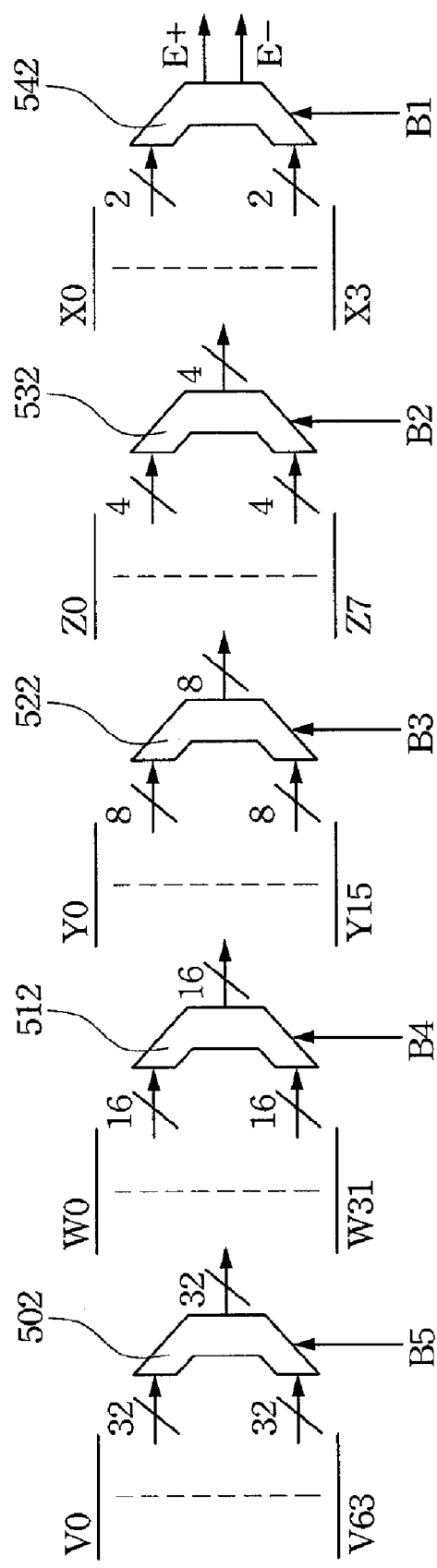
FIG. 5A is a circuit diagram depicting the DAC of FIG. 3 according to one preferred embodiment of the present invention.

FIG. 5A is a circuit diagram depicting the DAC 302 of FIG. 3 according to one preferred embodiment of the present invention. The DAC 302 includes, for example, five stages of mutliplexers 502, 512, 522, 532 and 542, with each stage corresponding to one of the five most significant bits (B1, B2, B3, B4, B5), and selecting one half of the gamma voltages provided from the former stage by reference to the corresponding most significant bit. That is, the first stage 502 selects thirty-two gamma voltages (W0~W31) from the sixty-four gamma voltages (V0~V63) by reference to the most significant bit B5, the second stage 512 selects sixteen voltages (Y0~Y15) from the thirty-two voltages (W0~W31) by reference to the most significant bit B4, the third stage 522 selects eight gamma voltages (Z0~Z7) from the sixteen gamma voltages (Y0~Y15) by reference to the most significant bit B3, the fourth stage 532 selects four gamma voltages (X0~X3) from the eight voltages (Z0~Z7) by reference to the most significant bit B2, and the fifth stage 542 selects the two reference voltages (E+, E−) from the four gamma voltages (X0~X3) by reference to the most significant bit B1.

Figure 5B:
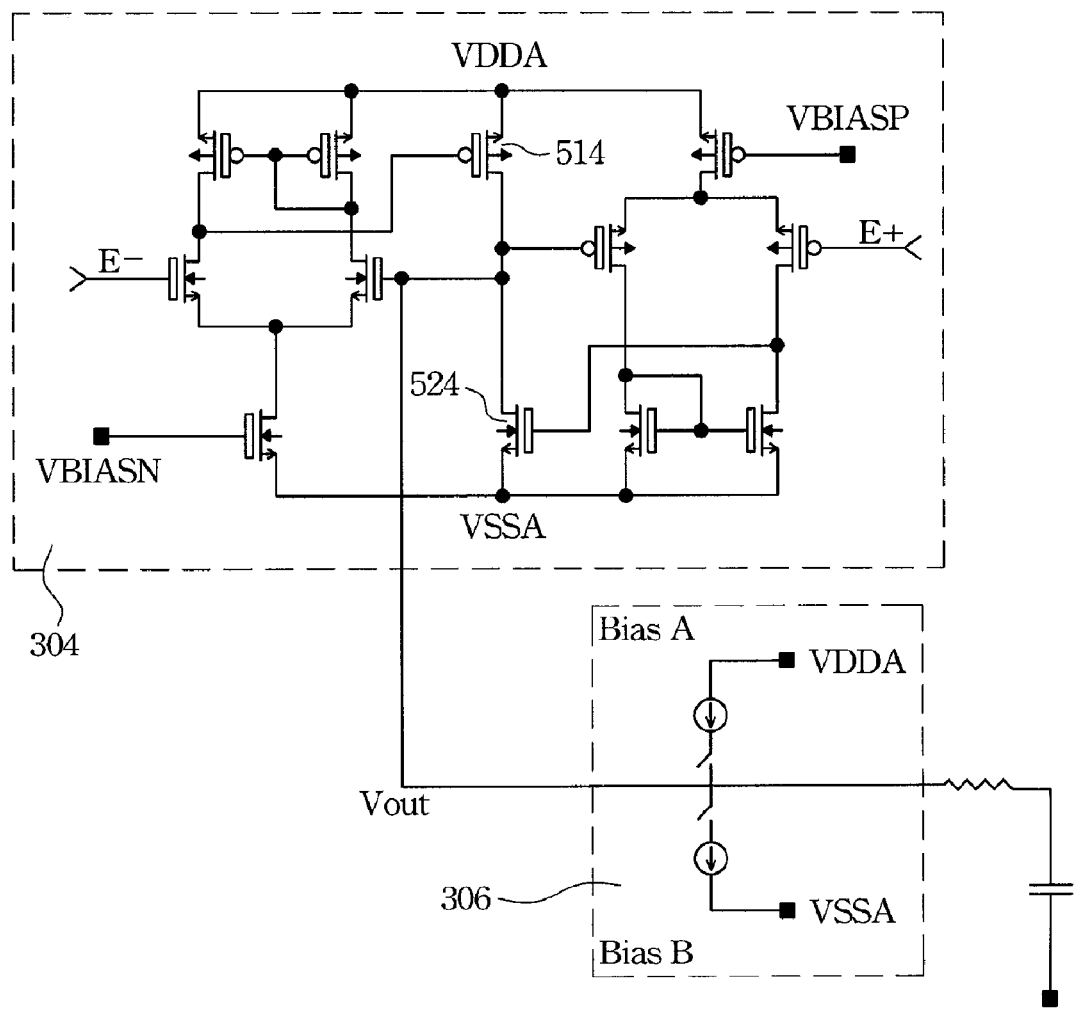
FIG. 5B is a circuit diagram depicting the clamp circuit and the fine tune circuit of FIG. 3 according to one preferred embodiment of the present invention.

FIG. 5B is a circuit diagram depicting the clamp circuit 304 and the fine tune circuit 306 of FIG. 3 according to one preferred embodiment of the present invention. Suppose the first reference voltage (E−) is lower than the second reference voltage (E+). The clamp circuit 304 has a PMOS transistor 514 and an NMOS transistor 524. The PMOS transistor 514 and the NMOS transistor 524 are electrically connected in series between a high-level voltage (VDDA) and a low-level voltage (VSSA), with a connection node thereof, i.e., the drains of the PMOS transistor 514 and the NMOS transistor 524, providing the output voltage (Vout).

With this architecture, when the output voltage (Vout) is lower than the first reference voltage (E−), the PMOS transistor 514 can pull up the output voltage (Vout) to be the first reference voltage (E−); when the output voltage (Vout) is higher than the second reference voltage (E+), the NMOS transistor 524 can pull down the output voltage (Vout) to be the second reference voltage (E+). Moreover, when the output voltage (Vout) is between the first reference voltage (E−) and the second reference voltage (E+), both of the PMOS transistor 514 and the NMOS transistor 524 can be turned off to avoid quiescent currents.

The fine tune circuit 306 has two bias circuits (Bias A and Bias B) coupled in series between the high-level voltage (VDDA) and the low-level voltage (VSSA), with a connection node thereof coupled to the output voltage (Vout), and the two bias circuits (Bias A and Bias B) can pull down or pull up the output voltage (Vout) to be the first reference voltage (E−) or the second reference voltage (E+) according to the least significant bit (B0) of the 6-bit signal.

For example, when the least significant bit (B0) is "0", the bias circuit (Bias A) turns on and the bias circuit (Bias B) turns off, so as to pull up the output voltage (Vout) to be the second reference voltage (E+); when the least significant bit (B0) is "1", the bias circuit (Bias B) turns on and the bias circuit (Bias A) turns off, so as to pull down the output voltage (Vout) to be the first reference voltage (E−).

Figure 6:
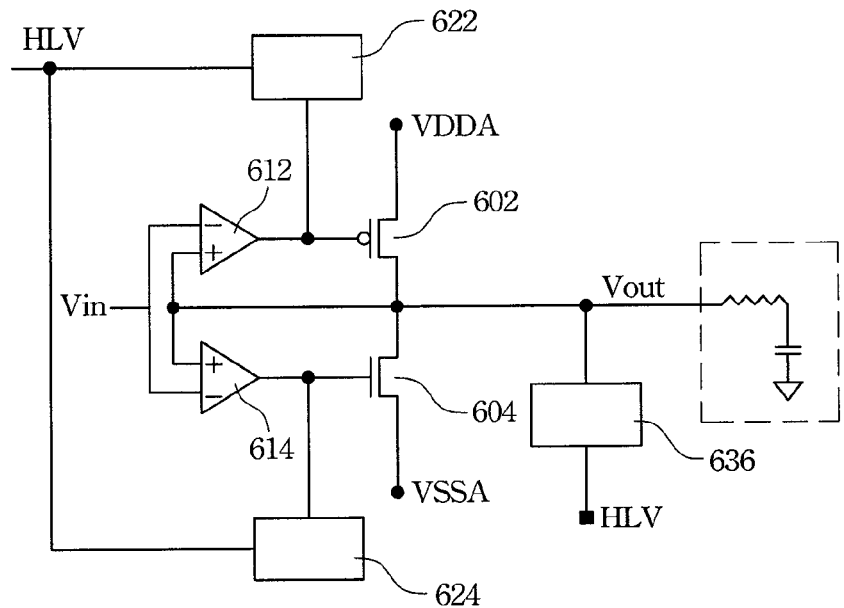
FIG. 6 is a block diagram depicting an output buffer provided for a source driver according to another preferred embodiment of the present invention.

FIG. 6 is a block diagram depicting an output buffer provided for the source driver according to another preferred embodiment of the present invention. The output buffer 600 has a PMOS transistor 602, a NMOS transistor 604, a first error amplifier 612, a second error amplifier 614, a first offset voltage generation circuit 622, a second offset voltage generation circuit 624 and a fine tune circuit 636.

The PMOS transistor 602 and the NMOS transistor 604 are electrically connected in series between a high-level voltage (VDDA) and a low-level voltage (VSSA). An inverting input (−) of the first error amplifier 612 receives an input voltage (Vin), the selected gamma voltage from the DAC 102, a non-inverting input (+) of the first error amplifier 612 is electrically connected to a connection node between the PMOS transistor 602 and the NMOS transistor 604, i.e., the drains of the PMOS transistor 602 and the NMOS transistor 604, to provide an output voltage (Vout), and an output of the first error amplifier 612 is electrically connected to the gate of the PMOS transistor 602. An inverting input (−) of the second error amplifier 614 receives the input voltage (Vin), the selected gamma voltage from the DAC 102, a non-inverting input (+) of the second error amplifier 614 is electrically connected to the connection node, and an output of the second error amplifier 614 is electrically connected to the gate of the NMOS transistor 604.

The first offset voltage generation circuit 622 is electrically connected to the output of the first error amplifier 612. The second offset voltage generation circuit 624 is electrically connected to the output of the second error amplifier 614, and the first and the second offset voltage generation circuits 622 and 624 are provided to pull up or pull down the output voltage to be between the input voltage (Vin) and the input voltage (Vin) plus or minus an offset voltage (Voffset). The fine tune circuit 636 is electrically connected to the non-inverting inputs (+) of the error amplifiers 612 and 614, and arranged to adjust the output voltage (Vout) to be the input voltage (Vin).

Figure 7:
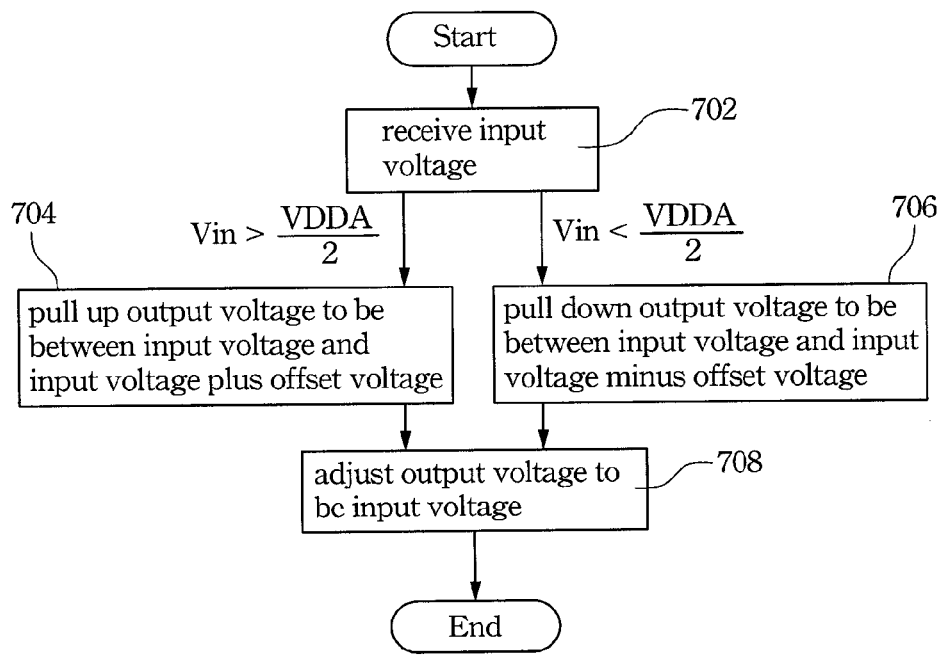
FIG. 7 is a flow chart depicting the output buffering method of the output buffer as shown in FIG. 6.

FIG. 7 is a flow chart depicting the output buffering method for the output buffer 600 as shown in FIG. 6. Firstly, an input voltage (Vin), the selected gamma voltage from the DAC 102, is received (step 702). An output voltage (Vout) is pulled up to be between the input voltage (Vin) and the input voltage plus an offset voltage (Vin+Voffset) when the input voltage (Vin) is above one half of the high-level voltage (VDDA/2) (step 704); or the output voltage (Vout) is pulled down to be between the input voltage (Vin) and the input voltage minus the offset voltage (Vin−Voffset) when the input voltage (Vin) is below one half of the high-level voltage (VDDA/2) (step 706). Then, the pulled output voltage (Vout) is adjusted to be the input voltage (Vin) (step 708).

Moreover, in FIG. 6, the first offset voltage generation circuit 622, the second offset voltage generation circuit 624 and the fine tune circuit 636 are switched on/off by reference to a control signal (HLV) which is indicative of the level of the input voltage (Vin), i.e. whether the input voltage (Vin) is above or below one half of the high-level voltage (VDDA/2).

Figure 8:
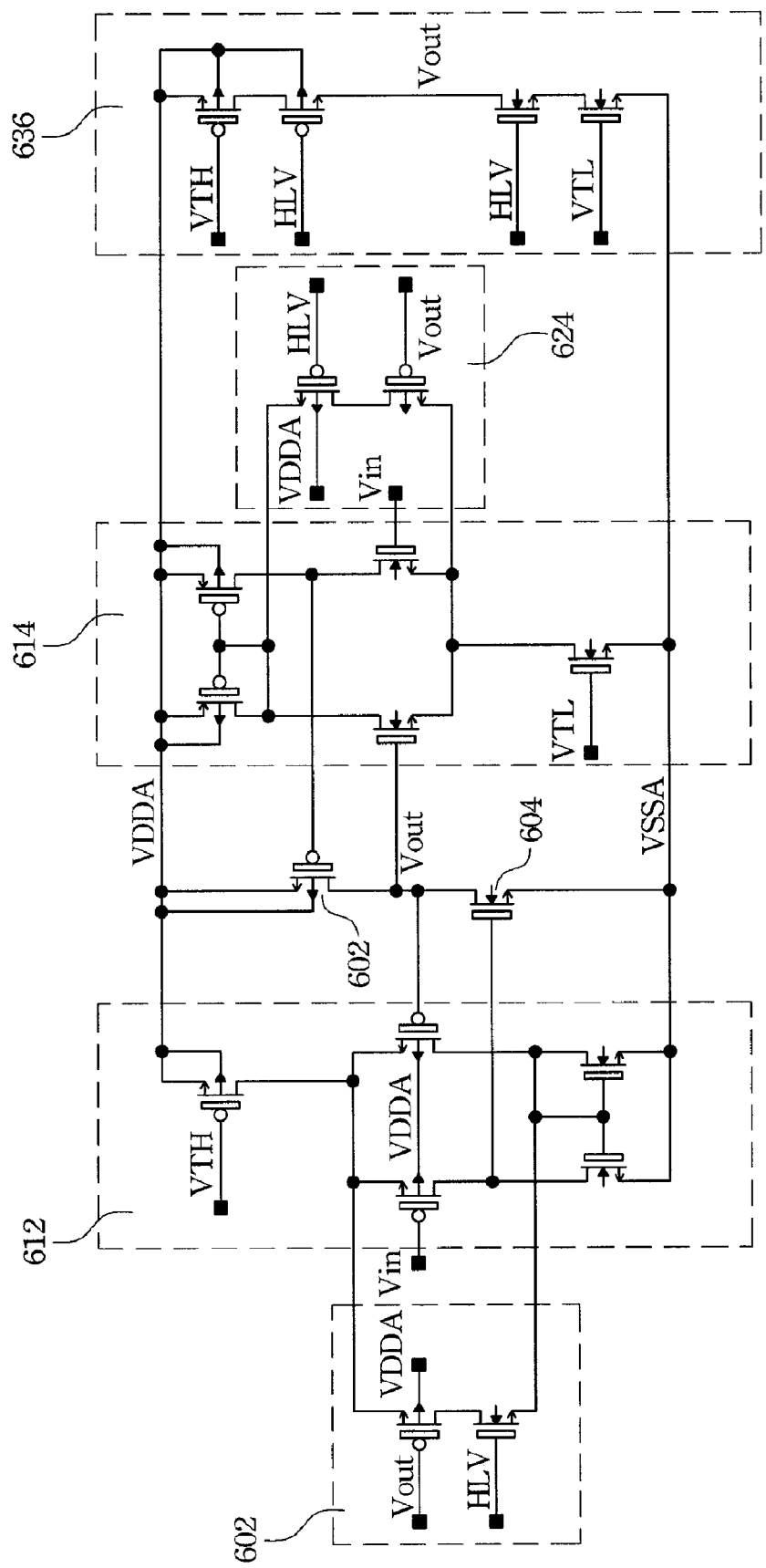
FIG. 8 is a circuit diagram depicting the output buffer of FIG. 6 according to one preferred embodiment of the present invention.
Figure 9A:
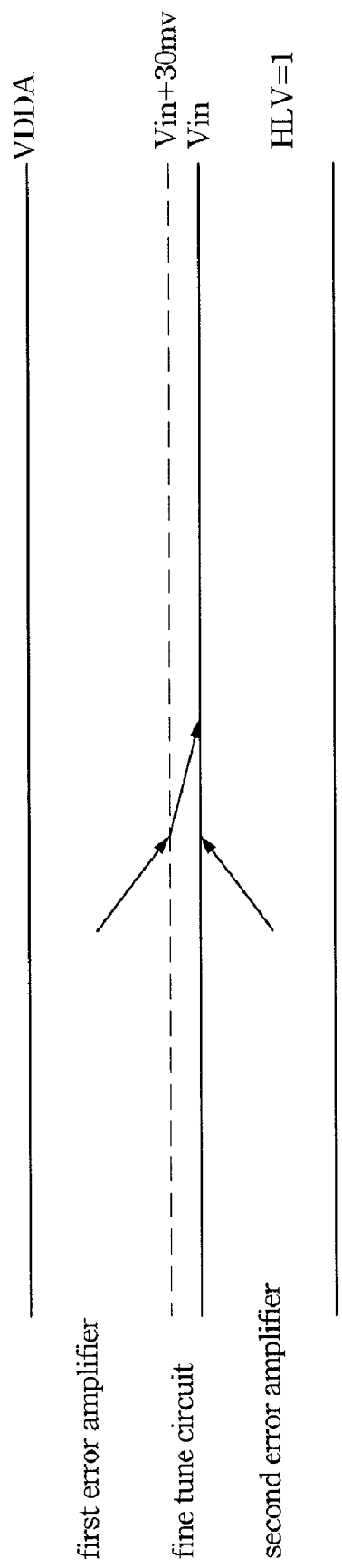
FIG. 9A is a schematic diagram of the output voltage pulled up when the input voltage (Vin) is above one half of high-level voltage (VDDA/2)
Figure 9B:
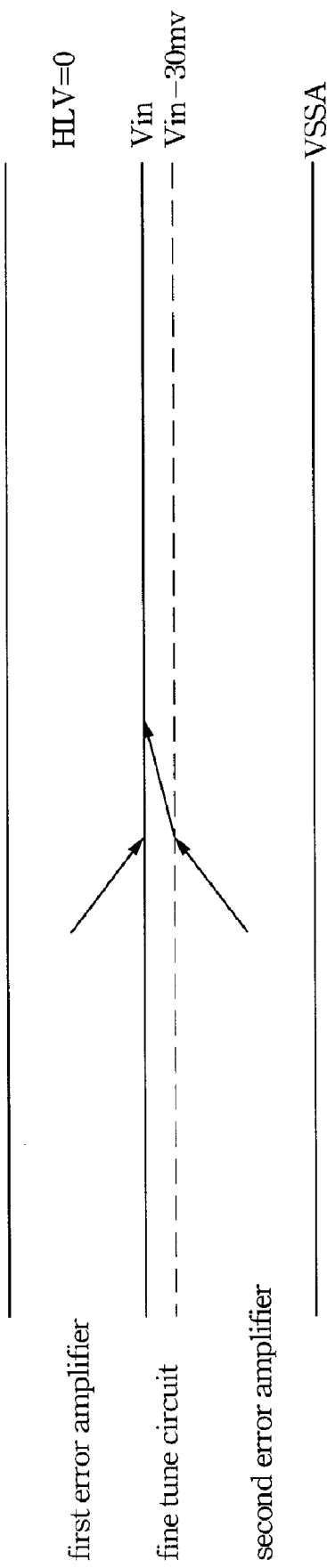
FIG. 9B is a schematic diagram of the output voltage pulled down when the input voltage (Vin) is below one half of the high-level voltage (VDDA/2).

FIG. 8 is a circuit diagram depicting the output buffer 600 of FIG. 6 according to one preferred embodiment of the present invention. FIG. 9A is a schematic diagram depicting the output voltage (Vout) pulled up when the input voltage (Vin) is above one half of the high-level voltage (VDDA/2). FIG. 9B is a schematic diagram depicting the output voltage (Vout) pulled down when the input voltage (Vin) is below one half of the high-level voltage (VDDA/2).

As illustrated in FIG. 8 and FIG. 9A, when the input voltage (Vin) is above one half of the high-level voltage (VDDA/2), the first error amplifier 612, the second error amplifier 614 and first offset voltage generation circuit 622 are turned on, and the second offset voltage generation circuit 624 is turned off, thus pulling up the output voltage (Vout) between the input voltage (Vin) and the input voltage plus the offset voltage (Vin+Voffset) to compensate the offset voltage incurred in the conventional output buffer 104.

As illustrated in FIG. 8 and FIG. 9B, when the input voltage (Vin) is below one half of the high-level voltage (VDDA/2), the first error amplifier 612, the second error amplifier 614 and second offset voltage generation circuit 624 are turned on, and the first offset voltage generation circuit 622 is turned off, thus pulling down the output voltage (Vout) between the input voltage (Vin) and the input voltage minus the offset voltage (Vin−Voffset) to compensate the offset voltage incurred in the conventional output buffer 104. That is, only one of the first offset voltage generation circuit 622 and the second offset voltage generation circuit 624 is turned on to compensate the offset voltage incurred in the conventional output buffer 104, and the other is turned off. Since the proposed offset voltage generation circuits 622 and 624 and the fine tune circuit 636 are only composed of a few transistors, the output buffer 600 only occupies a small chip area compared to the widely-used class AB amplifier without complicating the circuit design.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A source driver of a liquid crystal display, the source driver having a plurality of channel, and each channel comprising:
   a DAC, arranged to select a first reference voltage and a second reference voltage from a plurality of gamma voltages according to (N−1) most significant bits of an N-bit signal;
   a clamp circuit, arranged to receive the two reference voltages and clamp an output voltage between the two reference voltages; and
   a fine tune circuit, arranged to adjust the clamped output voltage to a target level according to the least significant bit of the N-bit signal.

2. The source driver as claimed in claim 1, wherein the first reference voltage is lower than the second reference voltage, and the clamp circuit comprises:
   a PMOS transistor, arranged to pull up the output voltage to be the first reference voltage when the output voltage is lower than the first reference voltage; and
   a NMOS transistor, arranged to pull down the output voltage to be the second reference voltage when the output voltage is higher than the second reference voltage.

3. The source driver as claimed in claim 2, wherein when the output voltage is between the first reference voltage and the second reference voltage, both of the PMOS transistor and the NMOS transistor are turned off to avoid quiescent currents.

4. The source driver as claimed in claim 1, wherein the target level is the first reference voltage or the second reference voltage.

5. The source driver as claimed in claim 4, wherein the fine tune circuit comprises two bias circuits coupled in series between a high-level voltage and a low-level voltage with a connection node thereof coupled to the output voltage, and the two bias circuits are arranged to pull down or pull up the output voltage to be the first reference voltage or the second reference voltage according to the least significant bit of the N-bit signal.

6. A source driving method for a liquid crystal display, comprising the steps of:
   selecting a first reference voltage and a second reference voltage from a plurality of gamma voltages according to (N−1) most significant bits of an N-bit signal;
   clamping an output voltage between the two reference voltages; and
   adjusting the clamped output voltage to a target level according to the least significant bit of the N-bit signal.

7. The source driving method as claimed in claim 6, wherein the first reference voltage is lower than the second reference voltage, and the clamping step comprises:
   pulling up the output voltage to be the first reference voltage when the output voltage is lower than the first reference voltage; and
   pulling down the output voltage to be the second reference voltage when the output voltage is higher than the second reference voltage.

8. The source driving method as claimed in claim 6, wherein the target level is the first reference voltage or the second reference voltage.

9. A source driver of a liquid crystal display, the source driver having a plurality of channels and each channel comprising:
   a DAC, arranged to select a reference voltage from a plurality of gamma voltages according to all the bits of an N-bit signal; and
   an output buffer, comprising:
      a PMOS transistor and a NMOS transistor, electrically connected in series between a high-level voltage and a low-level voltage;
      a first error amplifier, having an inverting input arranged to receive the reference voltage, a non-inverting input electrically connected to a connection node between the PMOS transistor and the NMOS transistor to output an output voltage, and an output electrically connected to the gate of the PMOS transistor;
      a second error amplifier, having an inverting input arranged to receive the reference voltage, a non-inverting input electrically connected to the connection node, and an output electrically connected to the gate of the NMOS transistor;
      a first offset voltage generation circuit and a second offset voltage generation circuit, respectively electrically connected to the outputs of the first error amplifier and the second error amplifier, wherein the offset voltage generation circuits are arranged to pull up or pull down the output voltage to be between the input voltage and the input voltage plus or minus an offset voltage; and
      a fine tune circuit, electrically connected to the non-inverting inputs of the error amplifiers, arranged to adjust the output voltage to be the input voltage.

10. The source driver as claimed in claim 9, wherein when the input voltage is above one half of the high-level voltage, the first error amplifier, the second error amplifier and first offset voltage generation circuit are turned on and the second offset voltage generation circuit is turned off, whereby pulling up the output voltage between the input voltage and the input voltage plus the offset voltage; and
   when the input voltage is below one half of the high-level voltage, the first error amplifier, the second error amplifier and second offset voltage generation circuit are turned on and the first offset voltage generation circuit is turned off, whereby pulling down the output voltage between the input voltage and the input voltage minus the offset voltage.

11. The source driver as claimed in claim 9, wherein only one of the first offset voltage generation circuit and the second offset voltage generation circuit is turned on, and the other is turned off.

12. The source driver as claimed in claim 9, wherein the first offset voltage generation circuit, the second offset voltage generation circuit and the fine tune circuit are switched on/off by reference to a control signal which is indicative of the level of the input voltage.

13. A source driving method of a liquid crystal display, comprising the steps of:
   selecting a reference voltage from a plurality of gamma voltages according to all the bits of an N-bit signal;
   pulling up an output voltage between the input voltage and the input voltage plus an offset voltage when the input voltage is above one half of a high-level voltage;
   pulling down the output voltage between the input voltage and the input voltage minus the offset voltage when the input voltage is below one half of a high-level voltage; and
   adjusting the pulled output voltage to be the input voltage.

14. The source driving method as claimed in claim 13, wherein the reference voltage is received at inverting inputs of a pair of error amplifiers, and the output voltage is provided at non-inverting inputs of the pair of error amplifiers.

15. The source driving method as claimed in claim 14, wherein an offset voltage is applied at outputs of the pair of error amplifiers.

* * * * *